(12) United States Patent
Juranitch

(10) Patent No.: US 9,926,217 B2
(45) Date of Patent: Mar. 27, 2018

(54) VITRIFIED MATERIAL CONTROL SYSTEM AND METHOD

(71) Applicant: Axenic Power LLC, Fort Lauderdale, FL (US)

(72) Inventor: James C. Juranitch, Fort Lauderdale, FL (US)

(73) Assignee: Plasma Tech Holdings, LLC, Bedford, NH (US)

( * ) Notice: Subject to any disclaimer, the term of this patent is extended or adjusted under 35 U.S.C. 154(b) by 0 days.

(21) Appl. No.: 15/003,737

(22) Filed: Jan. 21, 2016

(65) Prior Publication Data

US 2016/0207815 A1    Jul. 21, 2016

Related U.S. Application Data

(60) Provisional application No. 62/106,077, filed on Jan. 21, 2015.

(51) Int. Cl.
| | |
|---|---|
| *C03B 5/28* | (2006.01) |
| *C03B 7/18* | (2006.01) |
| *C03B 5/02* | (2006.01) |
| *C03B 5/235* | (2006.01) |
| *C03B 5/24* | (2006.01) |
| C03B 37/05 | (2006.01) |
| C03B 3/02 | (2006.01) |

(52) U.S. Cl.
CPC ............... *C03B 5/28* (2013.01); *C03B 5/025* (2013.01); *C03B 5/235* (2013.01); *C03B 5/24* (2013.01); C03B 3/02 (2013.01); C03B 37/055 (2013.01)

(58) Field of Classification Search
CPC ...................................................... C03B 7/18
See application file for complete search history.

(56) References Cited

U.S. PATENT DOCUMENTS

| | | | |
|---|---|---|---|
| 4,218,201 A * | 8/1980 | Kozima | B22F 9/082 425/7 |
| 6,160,238 A | 12/2000 | Titus et al. | |
| 2007/0022780 A1* | 2/2007 | House | C03B 5/225 65/29.21 |
| 2014/0166934 A1 | 6/2014 | Juranitch | |

FOREIGN PATENT DOCUMENTS

| | | |
|---|---|---|
| CN | 1616886 | 5/2005 |
| EP | 0134336 | 3/1985 |

* cited by examiner

*Primary Examiner* — Cynthia Szewczyk
(74) *Attorney, Agent, or Firm* — Dykema Gossett PLLC

(57) ABSTRACT

Systems and methods for controlling the flow of vitrified material. In at least some embodiments, a vitrified material control system comprises a melt chamber (8) configured to contain a molten material (27) during operation of the control system; a siphon valve (11) configured to facilitate a flow of the molten material from the melt chamber; and a vacuum-generation system (26, 15, 16) configured to controllably deliver a vacuum to the molten material in the melt chamber and to thereby regulate a flow of the molten material from the melt chamber. In other embodiments, methods of controlling a flow of molten vitrified material from a heating device are disclosed. The methods may include, for example, applying a vacuum to the molten material to control a dwell time of the molten material in a vessel of the heating device and regulating the vacuum based on a measured temperature of the molten material.

21 Claims, 4 Drawing Sheets

VITRIFIED MATERIAL CONTROL SYSTEM AND METHOD

CROSS-REFERENCE TO RELATED APPLICATIONS

This application claims the benefit of U.S. provisional application No. 62/106,077, filed 21 Jan. 2015, which is hereby incorporated by reference as though fully set forth herein.

BACKGROUND a. Field

This disclosure relates generally to a system and method for controlling the flow of hot vitrified material. The system and method can, in an embodiment, be successfully used for the manufacturing of renewable aggregate or renewable fiber products.

b. Background Art

High temperature vitrification is used to produce many modern products. Vitrification is the transformation of a material into a glass. The materials are usually inorganic in nature and many times amorphous in structure. The present disclosure is not limited to amorphous materials only.

The first phase of the vitrification process is the melting of material. During and after the melt is accomplished, it is challenging to control the pour flow and temperature of the molten material. The molten material can many times have a high melting temperature such as 2,000 to 4,000 degrees F. To control the pour flow of this high-temperature material reliably is a challenge.

Current high temperature pouring systems may incorporate a siphon valve into the outlet of a cupola. An example of this system can be seen in international publication number WO 2008/086991 A1 by Lars Elmekilde Hansen et al., which is hereby incorporated by referenced as though fully set forth herein. In this publication, the amorphous material is a silicon-based mix used to manufacture fiber. The siphon valve only keeps gasses from migrating in or out of the cupola. The amorphous material pours at will as it becomes viscous enough to overcome gravity and exit the cupola. Most modern pouring systems work this way. Siphon valves have been used to allow the flow of a liquid without allowing the back flow of gasses for many years. Those skilled in the art will find numerous examples of siphon valves in a normal household. Every sink drain or toilet will have a siphon valve. The valves are also known as "S-traps" and were patented by Alexander Cummings in 1775.

In the production of modern high-quality fibers, the uncontrolled flow of molten material is not ideal. Temperature in conventional systems for the pour is also very difficult to maintain or control under these conditions. The lack of temperature control negatively affects the quality of fiber or aggregate that is produced. There remains a need to address these problems.

BRIEF SUMMARY

The foregoing and other objects are achieved by the disclosed embodiments, which provide systems and methods for controlling the flow of hot, molten, vitrified material. The method can, in an embodiment, be successfully used for the manufacturing of conventional or renewable aggregate and fiber products. One of the methods of producing high-quality fiber is to develop a molten stream of inorganic product which is directed over a set of spinning wheels. The quantity of wheels is based on the production volume and will be a minimum of 1 wheel, but can be greater than 4 wheels. Modern high-quality fiber has specific requirements relating to its chemistry, fiber diameter, and fiber length. The fiber lengths and diameter can be controlled by the quantity of molten flow over the wheels, the viscosity of the molten flow, and the wheel speeds. The viscosity of the melt can be affected by the pour temperature and the material chemistry. The pour temperature usually requires different dwell times in the melter to control or affect the pour temperature. It may also require additional energy being added to the main furnace and the siphon valve pool to counteract energy losses. To control the flow and temperature of the melt, a control valve and energy management method is required. The disclosed embodiments teach a complete valve system employing a siphon valve component that can control both the rate of molten flow and the ability to turn the flow off or on to generate a dwell time in the melter for the inorganic material to reach optimum mix quality and temperature. Additional energy can also be applied to the melt in the siphon pool on exit as part of the embodiments.

This valve system works well with modern renewable syngas generation systems, natural gas, or other torch fired systems, including oxygen enriched torch systems and specifically plasma torch based melters.

The foregoing and other aspects, features, details, utilities, and advantages of the present embodiments will be apparent by reading the following description and claims, and from reviewing the accompanying drawings.

DETAILED DESCRIPTION OF EMBODIMENTS

Figure 1:
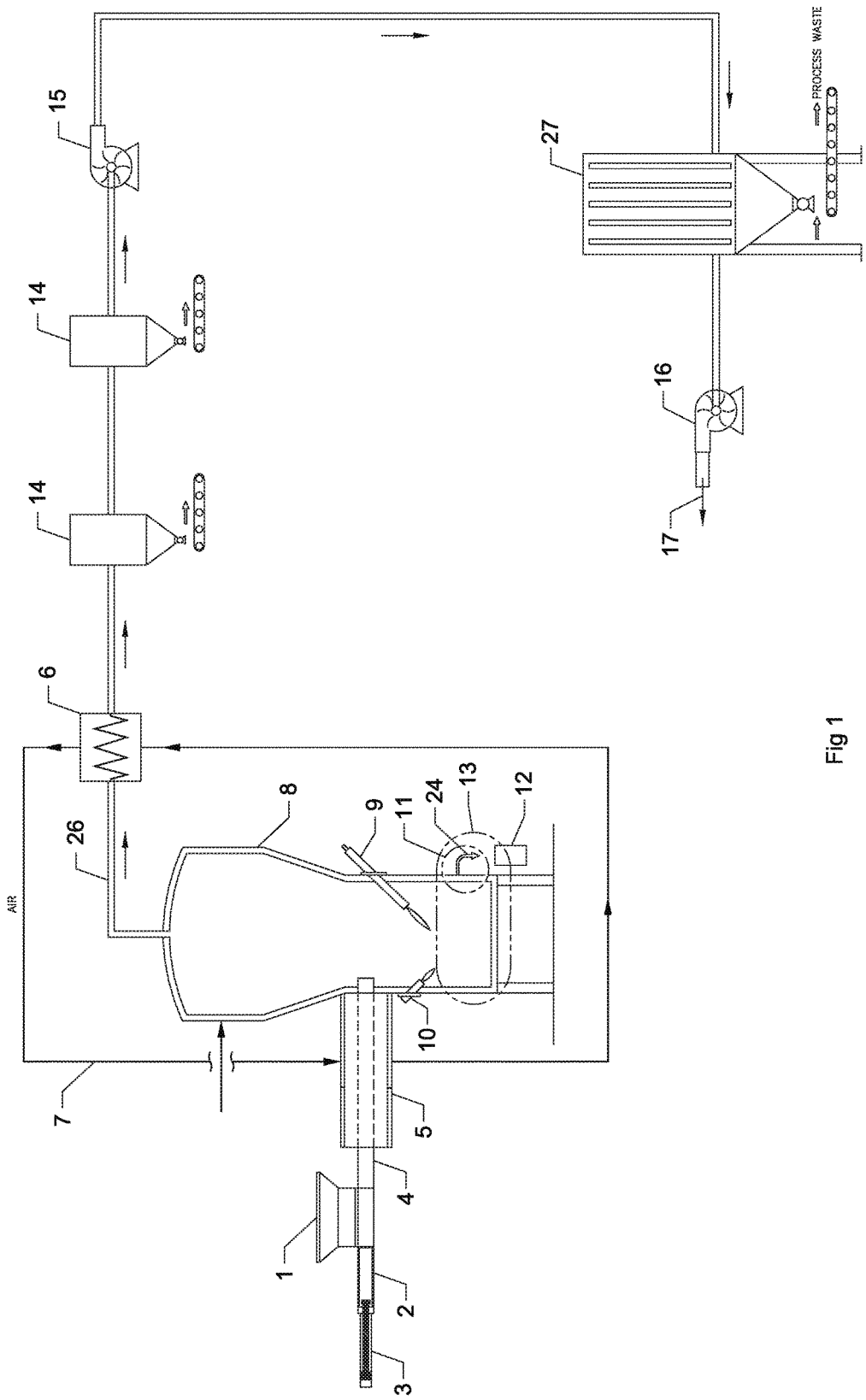
FIG. 1 is a simplified schematic representation of a specific illustrative embodiment of a system configured in accordance with the principles of the disclosed embodiments.
Figure 2:
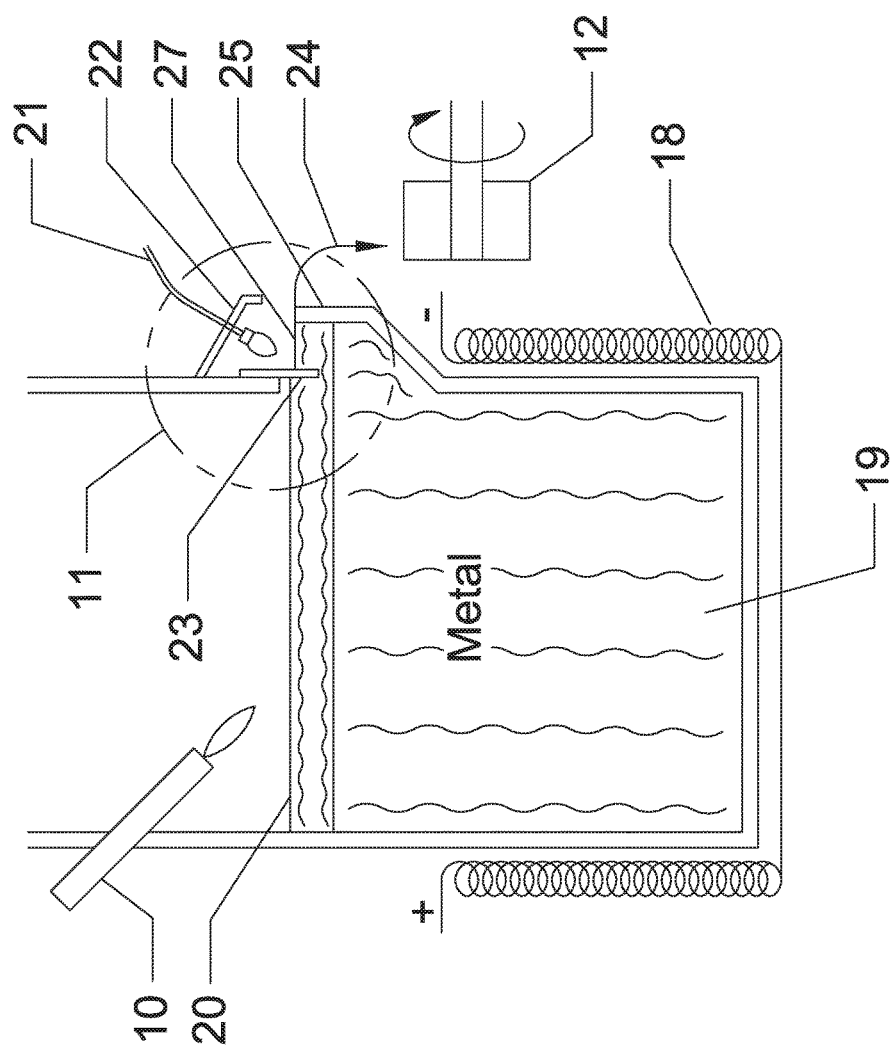
FIG. 2 is a more detailed side view of the siphon valve and melt subsystem.

Referring first to FIGS. 1 and 2, the vitrified material control system comprises a siphon valve 11, which includes a control brick or shield or plate 23 and an outlet dam 25. Due to the extreme duty that this siphon valve 11 must endure, the vertical distance that this control brick 23 projects downwardly from a wall of the sealed chamber 8 (and, thus, the distance this plated projects into the melt pool 27) is adjustable. The control brick 23 can be lowered as the siphon valve 11 is eroded. The outlet dam 25 can also be renewed, adjusted to compensate for wear and replaced as required. The torch 21 makes it possible to selectably add additional energy to melt pool 27. The torch can be any heat source and can run on any fuel such as propane or natural gas. The torch 21 could also be an electrical arc torch. The heat shield 22 helps minimize heat losses from melt pool 27, torch 21, melt 20, and pour 24. In the depicted embodiment, the outlet dam 25 is a replaceable part of the siphon valve 11. The heat shield 22, the torch 21, the adjustable control brick 23, and the adjustable and replaceable outlet dam 25 are attached to, or integrated into, the sealed chamber 8 (labeled in FIG. 1). Sealed chamber 8 is in communication with conduit 26. Conduit 26 is drawn down into a vacuum condition by induction fans 15 and 16. Two fans are shown, but one or more fans could be employed.

Figure 3:
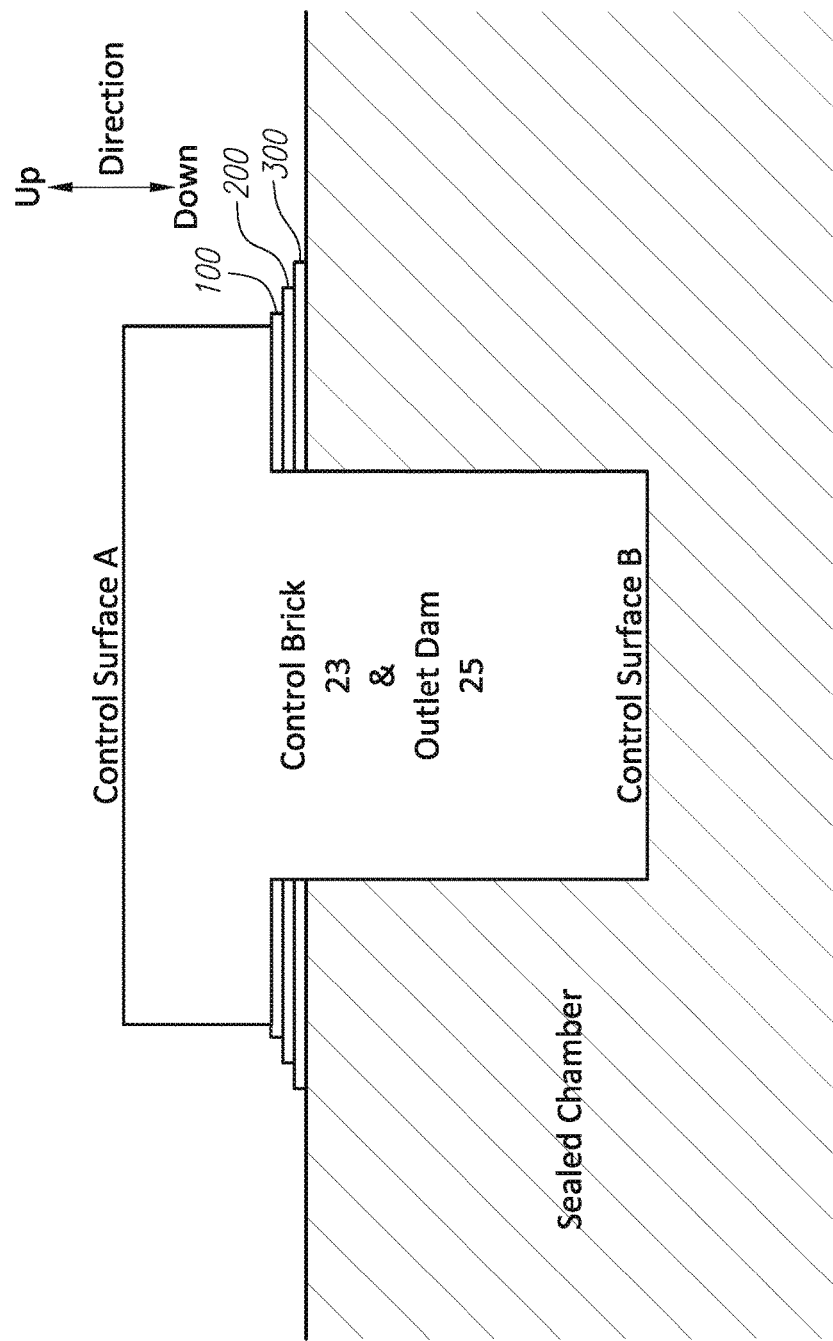
FIG. 3 is a simplified schematic representation of a specific illustrative embodiment of a control brick and outlet dam configured in accordance with the principles of the disclosed embodiments.

FIG. 3 shows an embodiment of an adjustable and replaceable control brick 23 and an adjustable and replaceable outlet dam 25. A plurality of shims (shims 100, 200, 300 are shown in FIG. 3 by way of example and without limitation) are added or removed for adjustment up or down of the control brick 23 or outlet dam 25. Control surface A is used in the case of the outlet dam and shims are added to adjust for wear. Control surface B is used as control brick 23 wears and the brick or gate is lowered. This is one of many possible embodiments to compensate for wear.

Induction fans 15, 16 are shown, but any evacuating system such as an ejector or venturi could also be employed to draw down a vacuum in the sealed chamber 8. In normal operation, the induction fans are in a favorable embodiment powered by variable frequency drives. The variable frequency drives are not shown for clarity. Those schooled in the art should be familiar with variable frequency drives. Two induction fans are taught herein since fan 15 can be employed to accomplish finer vacuum control in chamber 8. That will, in turn, produce finer flow control of pour 24 and of melt pool 27 height relative to outlet dam 25 in the valve system.

Figure 4:
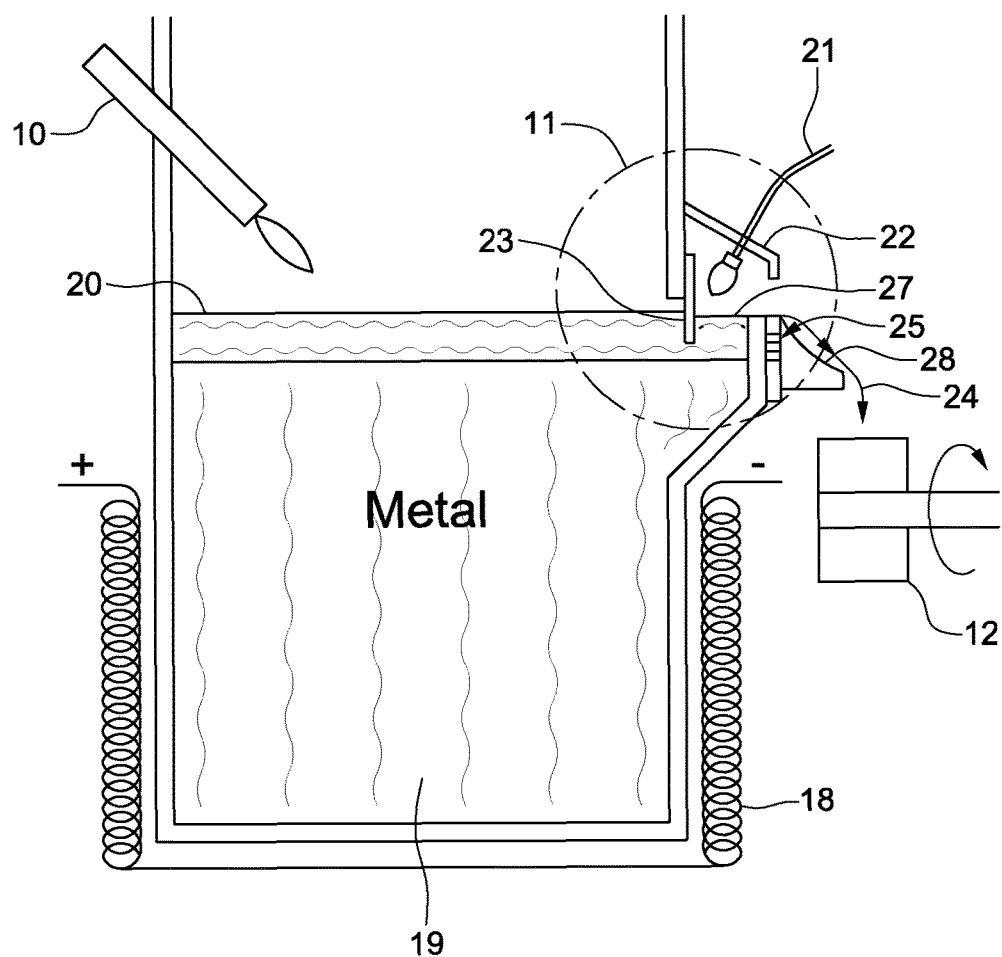
FIG. 4 is similar to FIG. 2, but depicts an optional outlet pour ramp and more clearly shows the outlet dam comprising the outlet dam configuration shown in FIG. 3.

FIG. 4 is similar to FIG. 2, but depicts an optional outlet pour ramp 28 and more clearly shows the outlet dam 25 comprising the outlet dam configuration shown in FIG. 3. Although alternative configurations for the outlet dam and the control brick are possible, the configuration depicted in FIG. 3 may be used for both the outlet dam 25 as well as for the control brick 23. If the outlet pour ramp 28 is present, it can assist with the control of the outlet flow.

Induction fans 15 and or 16 are driven by their electrical drives typically in a close looped pressure control fashion to maintain a vacuum condition that is great enough to pull pour 24 from melt pool 27 up into chamber 8. This suction and melt level modification lowers the fluid level of melt pool 27, which then converts the siphon valve 11 into a unique control valve system. The flow volume of melt pour 24 can be controlled by the ramping of the vacuum level in chamber 8 at a controlled rate. Flow of pour 24 can be stopped at any time by increasing the vacuum level in chamber 8 through the employment of induction fans 15 or 16 until melt pool 27 is lowered below the control height of dam 25. Pour 24, for the sake of clarity, is shown to be directed onto wheel 12 to produce fiber. Pour 24 is advantageously temperature controlled by the addition of thermal energy through plasma torch 9 or conventional torch 10 using any fuel such as propane or natural gas with or without oxygen enrichment. Metal bath 19 in FIG. 2 is employed as a temperature stabilizing environment, but also injects some thermal energy into melt 20 and pour 24. Metal bath 19 is reacted against current generated from induction coil 18 to generate thermal energy.

Material feed system 5 communicates with sealed chamber 8 via conduit 4. In order to keep chamber 8 sealed, feedstock is injected through plunger system 2 via hydraulic ram 3. The feedstock is communicated with conduit 4 through feeder 1 as ram 2 retracts to open a port (not shown for clarity) into feeder hoper number 1.

Thermal energy can also be transferred to the feedstock to reduce the work required of torches 9, 10 and metal bath 19 by employing pre-heating of the feedstock through heated air in conduit 7. The heated air receives its energy from heat exchanger 6. Emissions control cyclones 14 and bag house 27 are familiar to those schooled in the art. A large variety of other emission control and exhaust gas conditioning components can be put in series or parallel (slip streams) with these basic examples of exhaust gas conditioning. The final exhaust gas product is show in FIG. 1 to be exiting as item 17.

The invention claimed is:

1. A vitrified material control system comprising the following:
  a melt chamber configured to contain a molten material during operation of the control system;
  a siphon valve configured to facilitate a flow of the molten material out of said melt chamber, said siphon valve comprising the following:
    a plate; and
    an outlet dam, wherein said outlet dam and said plate together define a melt pool; and
  a vacuum-generation system configured to controllably deliver a vacuum to the molten material in said melt chamber and to thereby directly regulate a flow of the molten material over said outlet dam by regulating the flow of the molten material from said melt chamber and into the melt pool.

2. The vitrified material control system of claim 1, wherein said plate is adjustable and replaceable.

3. The vitrified material control system of claim 1, wherein said outlet dam is removable and replaceable.

4. The vitrified material control system of claim 1, wherein said siphon valve further comprises (a) a heat shield mounted adjacent to said melt pool and configured to reduce heat loss from said melt pool, and (b) a supplemental energy source mounted to said heat shield and configured to deliver supplemental energy to said melt pool.

5. The vitrified material control system of claim 4, wherein said supplemental energy source comprises a torch.

6. The vitrified material control system of claim 1, wherein said vacuum-generation system further comprises (a) a conduit attached to said melt chamber, and (b) at least one induction fan operatively connected to said conduit.

7. The vitrified material control system of claim 1, wherein said vacuum-generation system further comprises (a) a conduit attached to said melt chamber, and (b) a suction device selected from the group consisting of a venture, an ejector, and an induction fan, wherein said suction device is operably attached to said conduit.

8. The vitrified material control system of claim 1 further comprising a metal bath attached below said melt chamber.

9. The vitrified material control system of claim 1 further comprising an inductively-activated metal bath adapted to temperature stabilized the molten material in said melt chamber.

10. The vitrified material control system of claim 1, wherein said vacuum-generation system comprises at least two induction fans connected in parallel or in series.

11. The vitrified material control system of claim 1 further comprising a material feed system in communication with said melt chamber, wherein said material feed system comprises an air-locked plunger system or a screw-auger system.

12. The vitrified material control system of claim 11 further comprising an air recirculating system, wherein said air recirculating system is configured to preheat feedstock in said material feed system.

13. The vitrified material control system of claim 1, wherein said melt chamber comprise a heat source in a vessel.

14. The vitrified material control system of claim 13, wherein said heat source is a plasma torch.

15. The vitrified material control system of claim 13, wherein said heat source is selected from the group consisting of a conventional torch, a plasma torch, an electric arc torch, and an inductive metal bath.

16. A vitrified material control system comprising the following:
- a melt chamber configured to contain a molten material during operation of the control system;
- a siphon valve configured to facilitate a flow of the molten material out of said melt chamber, said siphon valve comprising the following:
  - a plate, wherein said plate is adjustable and replaceable;
  - an outlet dam, wherein said outlet dam and said plate together define a melt pool;
  - a heat shield mounted adjacent to said melt pool and configured to reduce heat loss from said melt pool; and
  - a torch mounted to said heat shield and configured to deliver supplemental energy to said melt pool; and
- a vacuum-generation system configured to controllably deliver a vacuum to the molten material in said melt chamber and to thereby regulate a flow of the molten material from said melt chamber and into the melt pool.

17. A vitrified material control system comprising the following:
- a melt chamber configured to contain a molten material during operation of the control system;
- a siphon valve configured to facilitate a flow of the molten material out of said melt chamber, said siphon valve comprising the following:
  - a plate; and
  - an outlet dam, wherein said outlet dam and said plate together define a melt pool;
- a vacuum-generation system configured to controllably deliver a vacuum to the molten material in said melt chamber and to thereby regulate a flow of the molten material from said melt chamber and into the melt pool; and
- a metal bath attached below said melt chamber.

18. A vitrified material control system comprising the following:
- a melt chamber configured to contain a molten material during operation of the control system;
- a siphon valve configured to facilitate a flow of the molten material out of said melt chamber, said siphon valve comprising the following:
  - a plate; and
  - an outlet dam, wherein said outlet dam and said plate together define a melt pool;
- a vacuum-generation system configured to controllably deliver a vacuum to the molten material in said melt chamber and to thereby regulate a flow of the molten material from said melt chamber and into the melt pool; and
- an inductively-activated metal bath adapted to temperature stabilized the molten material in said melt chamber.

19. A vitrified material control system comprising the following:
- a melt chamber configured to contain a molten material during operation of the control system;
- a siphon valve configured to facilitate a flow of the molten material out of said melt chamber, said siphon valve comprising the following:
  - a plate; and
  - an outlet dam, wherein said outlet dam and said plate together define a melt pool;
- a vacuum-generation system configured to controllably deliver a vacuum to the molten material in said melt chamber and to thereby regulate a flow of the molten material from said melt chamber and into the melt pool;
- a material feed system in communication with said melt chamber, wherein said material feed system comprises an air-locked plunger system or a screw-auger system; and
- an air recirculating system, wherein said air recirculating system is configured to preheat feedstock in said material feed system.

20. A vitrified material control system comprising the following:
- a melt chamber configured to contain a molten material during operation of the control system, wherein said melt chamber comprise a plasma torch in a vessel;
- a siphon valve configured to facilitate a flow of the molten material out of said melt chamber, said siphon valve comprising the following:
  - a plate; and
  - an outlet dam, wherein said outlet dam and said plate together define a melt pool; and
- a vacuum-generation system configured to controllably deliver a vacuum to the molten material in said melt chamber and to thereby regulate a flow of the molten material from said melt chamber and into the melt pool.

21. A vitrified material control system comprising the following:
- a melt chamber configured to contain a molten material during operation of the control system, wherein said melt chamber comprise a heat source in a vessel, and wherein said heat source is selected from the group consisting of a conventional torch, a plasma torch, an electric arc torch, and an inductive metal bath;
- a siphon valve configured to facilitate a flow of the molten material out of said melt chamber, said siphon valve comprising the following:
  - a plate; and
  - an outlet dam, wherein said outlet dam and said plate together define a melt pool; and
- a vacuum-generation system configured to controllably deliver a vacuum to the molten material in said melt chamber and to thereby regulate a flow of the molten material from said melt chamber and into the melt pool.

* * * * *